United States Patent [19]

Liu et al.

[11] Patent Number: 5,530,703
[45] Date of Patent: Jun. 25, 1996

[54] REMOTE COMMUNICATION SERVER WITH AUTOMATIC FILTERING

[75] Inventors: Vince Liu, Saratoga; Shirley (Tsyr-Yi) Sun; Alan Ko, Sunnyvale, all of Calif.

[73] Assignee: 3Com Corporation, Santa Clara, Calif.

[21] Appl. No.: 311,066

[22] Filed: Sep. 23, 1994

[51] Int. Cl.$^6$ .................................................. H04L 12/46
[52] U.S. Cl. ...................................... 370/85.13; 370/94.1
[58] Field of Search ................................. 370/60, 85.13, 370/94.3, 85.14, 94.2, 94.1, 110.1, 85.12, 92, 85.15, 60.1, 61; 340/825.52

[56] References Cited

U.S. PATENT DOCUMENTS

| | | | |
|---|---|---|---|
| 4,760,572 | 7/1988 | Tomikawa | 370/94.1 |
| 4,998,245 | 3/1991 | Tanaka et al. | 370/94.1 |
| 5,216,670 | 6/1993 | Ojek et al. | 370/94.1 |
| 5,309,437 | 5/1994 | Perlman et al. | 370/94.1 |
| 5,315,592 | 5/1994 | Conant et al. | 370/94.1 |
| 5,361,256 | 11/1994 | Doeringer et al. | 370/94.1 |
| 5,379,296 | 1/1995 | Johnson et al. | 370/85.13 |

OTHER PUBLICATIONS

"AccessBuilder Remote Access Servers", Product Literature, 3Com Corporation, Santa Clara, California, 1994.
"Remote Networking Extending the Bounds of the Enterprise to Remote Offices and Remote Users", Product Literature, 3ComCorporation, Santa Clara, California, 1994.

*Primary Examiner*—Wellington Chin
*Assistant Examiner*—Chau T. Nguyen
*Attorney, Agent, or Firm*—Haynes & Davis

[57] ABSTRACT

Unneeded broadcast and multicast packets are blocked by a remote access server from pass through on a private or switched circuit communication link to a remote node of an corporate LAN, if they relate to protocols not in use by the remote node, or involve information which the remote node does not need. The remote access server includes logic which automatically learns the protocols which the remote node is relying upon, and configures filtering logic for the multi-destination packets in response to the learned protocols. The server executes a method for managing pass through of multi-destination packets, including (1) learning a protocol used by the remote node in response to a packet transmitted to the network by the remote node; (2) storing an identifier of the learned protocol; (3) identifying a protocol of a multi-destination packet in the network; and (4) selecting multi-destination packets to be forwarded to the remote node in response to the stored identifier of the protocol in use by the remote node, and the identified protocol of the multi-destination packet. In addition, a technique for bypasssing the protocol based filtering includes storing addresses provided by the remote node in a multicast address table of multi-destination packets to be forwarded to the remote node; and selecting multi-destination packets to be forwarded to the remote node if the multi-destination packet has a multicast address in the multicast address table.

35 Claims, 11 Drawing Sheets

1

REMOTE COMMUNICATION SERVER WITH AUTOMATIC FILTERING

BACKGROUND OF THE INVENTION

1. Field of the Invention

The present invention relates to technology for remotely connecting to a network; and more particularly to managing traffic flow across communication links between a remote node and a local network.

2. Description of Related Art

Local area network (LAN) technology has been evolving to provide interconnection among LANs to establish corporate-wide networks. For businesses with remote offices, there is a need to interconnect remote offices to the corporate network, with technology referred to as remote networking. Remote networking extends the logical boundaries of the corporate LAN to give remote offices, telecommuters, and mobile users access to critical corporate resources.

One important user of remote networking is the single user working remotely from an office or on the road, who has a need to exchange data with the corporate network via dialup connections or other communications media.

For these smaller users of network resources, the cost of dedicated network connections is usually prohibitive. Thus, they rely on dialup connectivity, using high speed modems and analog links, ISDN terminal adapters and basic rate interface (BRI) services, or other DSU/CSU devices and Switched 56 lines. A mobile user of the corporate network, such as a business traveler may rely on analog dialup access as their only connection alternative to the corporate.

There are many broadcast and multicast packets which appear on LANs. Most of these packets are useless to a remote node, especially when they relate to a protocol not in use by the remote node. When a user is directly connected to a LAN, such as Ethernet or TokenRing, the performance impact on the user of these broadcast and multicast packets is minimal because of the substantial bandwidth of the LAN. However, for remote nodes connected to a LAN via a switched communication link, such packets have a large impact on the performance of the remote node because they consume a substantial part of the bandwidth of the switched network connection.

One prior art system for providing remote access is known as the AccessBuilder Remote Access Server, manufactured by 3Com Corporation of Santa Clara, Calif. The remote access server manages multiple simultaneous protocols in the corporate LAN and the forwarding of data packets between the switched connection to the remote node, and the corporate LAN. This device includes a multiprotocol engine and a series of node emulators. The multiprotocol engine handles all addressing, routing information, and routing tables for the remote clients dialing into a LAN environment. From the perspective of both the remote node and the corporate LAN, the multiprotocol engine appears local to the corporate LAN segment.

Node emulators are logical nodes that serve as proxies for the remote nodes. To the corporate network and the network manager, the node emulator appears as an actual node residing on the corporate LAN. In this way, the node emulator provides a point of stability that masks the otherwise transitory character of the dialup remote access.

When a user dials into the node emulator, it is assigned an address. All traffic from the remote client issues from this address, and all traffic sent to the remote client filters through this address.

Because clients dial in from many different types of environments, each running different protocols, each node emulator must adapt its functionality dynamically. On a client-by-client basis, each node emulator conforms to the relevant protocol suite of the remote node it currently represents.

One type of traffic which must be managed by the remote access server is broadcast and multicast packets. The prior art AccessBuilder product includes a filter to manage transmission of broadcast and multicast packets across the switched link to the remote node. However, this filter in the prior art system has to be configured by a network administrator who was knowledgeable about the protocols being used. Thus, most often, the filter was not properly configured, or not configured at all.

Accordingly, it is desirable to provide a remote access server device, which does not need to be manually configured by an administrator, yet effectively manages the transmission of broadcast and multicast packets across the switched network link to the remote node.

SUMMARY OF THE INVENTION

The present invention provides technology to reduce unneeded broadcast and multicast packets passed through a private or switched circuit communication link to a remote node of an corporate LAN from a remote access server connected to the LAN.

Multicast and broadcast packets (herein referred to as multi-destination packets) which relate to protocols not in use by the remote node, or involve information which the remote node does not need, can be blocked by the remote access server, saving substantial bandwidth on the communication link. According to the present invention, the remote access server need not be manually configured. Rather, it includes logic which automatically learns the protocols which the remote node is relying upon, and configures filtering logic for the multi-destination packets in response to the learned protocols.

Thus, according to the present invention, a method for managing pass through of multi-destination packets from a network across a communication link to a remote node of the network is provided. The method comprises:

learning a protocol used by the remote node in response to a packet transmitted to the network by the remote node;

storing an identifier of the learned protocol;

identifying a protocol of a multi-destination packet in the network; and selecting multi-destination packets to be forwarded to the remote node in response to the stored identifier of the protocol in use by the remote node, and the identified protocol of the multi-destination packet.

In addition, the present invention provides a technique for bypassing the protocol based filtering, which includes storing addresses provided by the remote node in a multicast address table of multi-destination packets to be forwarded to the remote node; and selecting multi-destination packets to be forwarded to the remote node if the multi-destination packet has a multicast address in the multicast address table.

The steps of learning the protocol in use by the remote node, and of identifying the protocol of a multi-destination packet on the LAN are based on protocol type or packet type information that is in the packet. Thus, the packets in the network have a packet type field in many protocols. The step of learning or identifying may include determining the network protocol of the packet in response to the packet type field. Also, some network protocols have a packet format which includes a source service access point (SSAP) field. The step of learning or identifying may include the step of determining the network protocol of the packet in response to the SSAP field. Filtering can be done to select a limited subset of the set of multi-destination packet types used by a given protocol, so that the remote node sees only packets from the appropriate protocol and only packets from that protocol which are useful. The useful packet types can be identified based upon packet type fields, SSAP fields and network-specific command fields.

In addition, the system includes resources to detect when an unknown protocol is used by the remote node, to learn characteristics of packets according to the unknown protocol and to select for forwarding to the remote node multi-destination packets in the corporate network which have the learned characteristics.

These learning and identifying techniques are carried out independent of the network address or MAC level address of the packets being transmitted. Thus, the remote node and the network manager need not explicitly address packets to the remote access server in order to configure the device. Rather, the device is automatically configured using the normal traffic from the remote node.

According to another aspect, the invention can be characterized as an apparatus which manages transfer of broadcast and multicast packets from a local area network to a remote node of the network. This apparatus includes a first port which serves a switched network link which provides a path to the remote node. Also, a second port is included which serves the local area network. Incoming packet forwarding resources, forward packets originated by the remote node from the first port to the second port. Learning logic learns network protocols associated with packets forwarded from the first port to the second port in response to protocol-specific information in the packets and stores identifiers of the learned protocols. Filtering logic including a plurality of protocol-specific filters and logic for enabling and disabling the protocol-specific filters in response to the stored identifiers, is included. The filtering logic identifies network protocols associated with broadcast and multicast packets originated in the network in response to protocol-specific information in the packets. Also, the logic selects broadcast and multicast packets to be forwarded to the remote node in response to the identified network protocols and the enabled and disabled protocol-specific filters. Outgoing packet forwarding resources forward unicast packets addressed to the remote node, and forward broadcast and multicast packets selected by the filtering logic from the second port to the first port.

In addition, the apparatus may include resources which store multicast addresses supplied by the remote node, and the filtering logic is responsive to the stored multicast addresses to select multicast packets to be forwarded from the second port to the first port, independent of the network protocol associated with the packet.

Accordingly, a remote access server is provided which automatically filters broadcast and multicast packets based on a user's traffic pattern. This limits the amount of broadcast and multicast traffic in the switched asynchronous line. This overcomes the difficulties of installation in prior art systems which required manual filter programming. Further, the overall performance of the system is much better in changing environments, in which a manual programming technique cannot effectively be applied. The invention makes remote networking much simpler, and moves the remote access server closer to an ideal "plug and play" system.

Other aspects and advantages of the present invention can be seen upon review of the figures, the detailed description, and the claims which follow.

DETAILED DESCRIPTION OF PREFERRED EMBODIMENTS

A detailed description of a preferred embodiment of the present invention is provided with respect to the figures.

Figure 1:
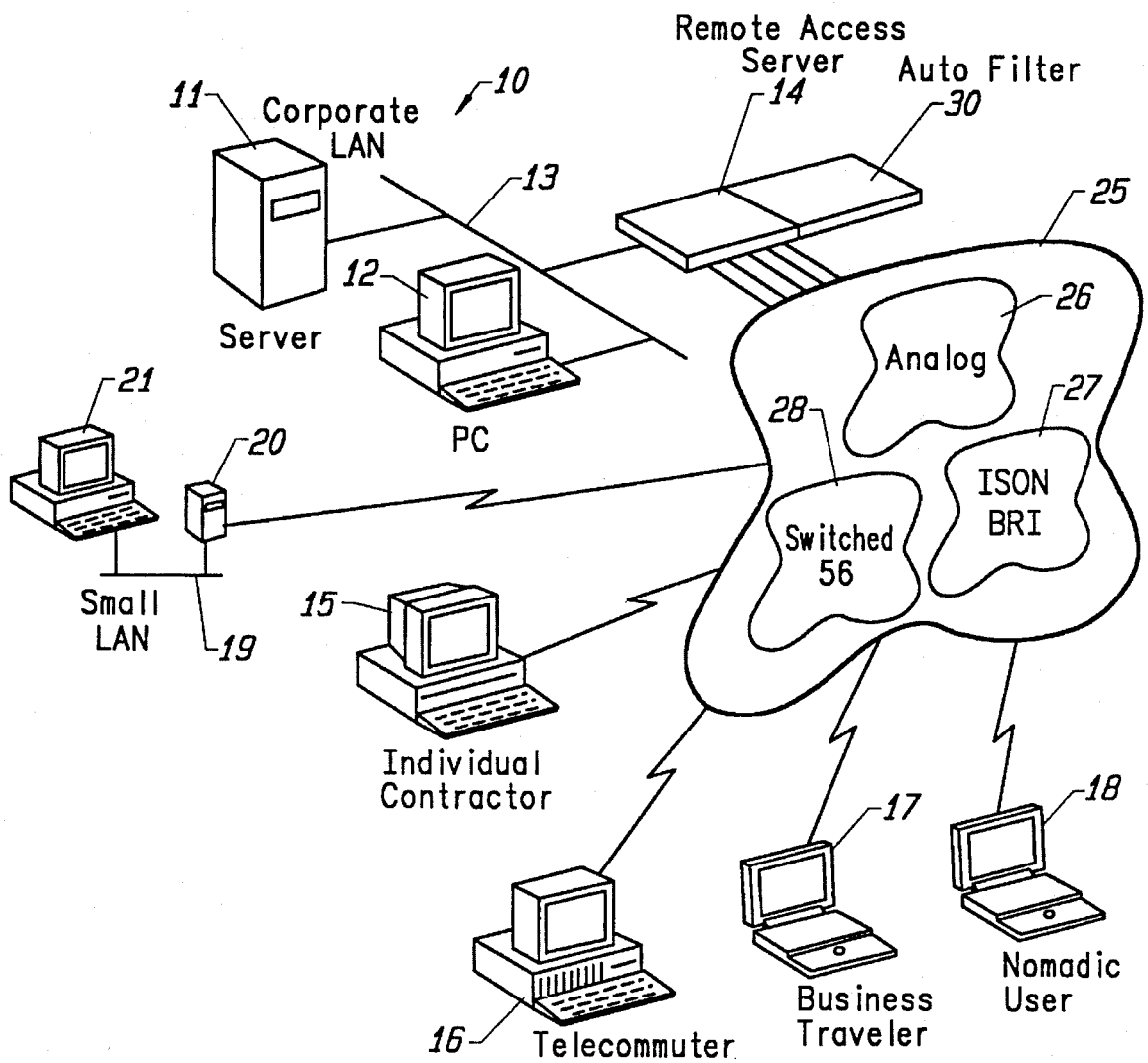
FIG. 1 is a diagram illustrating a context for a remote access server with auto filtering according to the present invention.

FIG. 1 illustrates the remote internetworking environment in which the present invention is applied. This environment includes a corporate or corporate LAN, generally 10, which includes a server 11, a number of users, such as user 12, all interconnected by a local area network 13, such as an Ethernet network, or a TokenRing network. A remote access server 14 is connected to the network 13 to manage transfers of data packets between the network and a remote node. Remote nodes in the example shown in FIG. 1 may include a computer at the site of a contractor doing work for the corporation, such as computer 15, a computer 16 at the home of a telecommuter, a computer 17 being used by a business traveller, and a computer 18 of a nomadic user who is given access to the corporate LAN. Also, the remote node may comprise a small LAN 19 which includes an access point 20 and at least one computer 21 which needs access to the corporate LAN 10.

The remote access server 14 is coupled to a switched network 25 which may be analog telephone lines 26, ISDN lines, basic rate interface (BRI) services 27, a Switched 56 lines 28, or other network types. These are all dialup services by which the remote node, such as telecommuter 16 dials up to establish a point-to-point connection between the remote access server 14 and the remote node 16.

The remote access server gives the mobile computer users and telecommuters full access to the resources of the corporate LAN 10. The remote nodes dial into the remote access server over the public switched telephone network to get direct, transparent links to Ethernet or TokenRing LANs at the corporate site, just as if they were connected locally. The remote access server 14 supports a broad range of computing platforms, network operating systems, and protocols to fit a variety of network environments. It also provides multiprotocol bridging and routing for wide area client to local area network connectivity.

Further, according to the present invention, the remote access server includes automatic filtering resources 30. These resources automatically learn a protocol used by the remote node in response to a packet transmitted to the corporate LAN 10 by the remote node. Further, identifiers of the learned protocols are stored in the remote access server 14. The automatic filtering resources identify a protocol of a multi-destination packet, such as a broadcast packet or a multicast packet which originates in the corporate LAN 10, and selects the broadcast and multicast packets to be forwarded to the remote node in response to the stored identifier and the identified protocol of the broadcast or multicast packet. Further, it includes resources that store addresses provided by the remote node in a multicast address table. Multicast packets originating from the corporate LAN 10 are forwarded to the remote node if the multicast packet has a multicast address stored in the multicast address table. This provides a technique for bypassing the automatically learned protocol-specific filtering.

Figure 2:
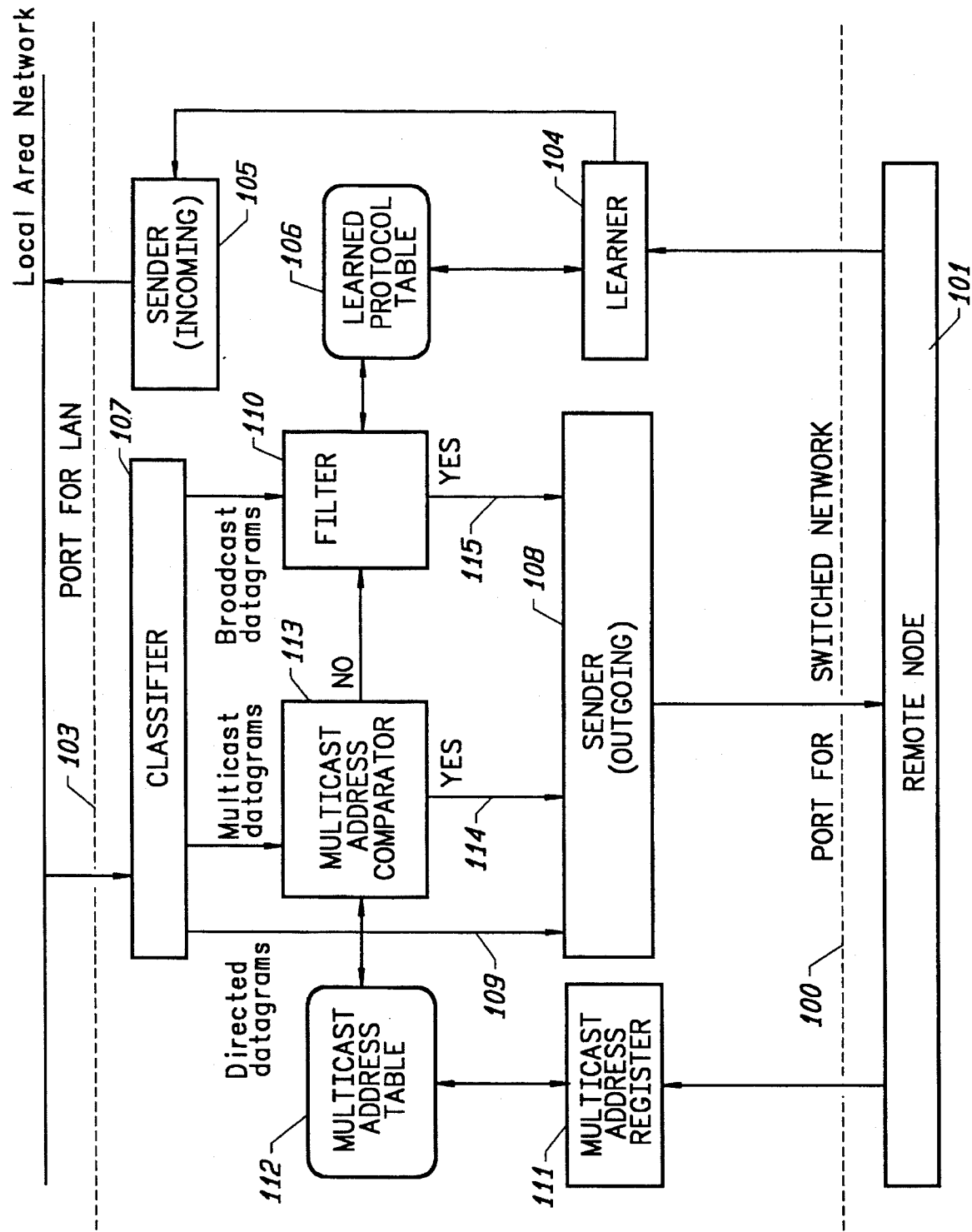
FIG. 2 is a block diagram of a remote access server with auto filtering according to the present invention.

FIG. 2 provides a block diagram of the automatic filtering system which manages pass through of multi-destination packets from the network across the communication link to the remote node of the network. This system has a first port 100 which serves the switched network, or another communication medium which provides a path to remote node 101. Also, the system includes a second port 103 which serves the communication medium of the corporate LAN. Thus, users of the corporate network have a path through the second port 103 to the remote access server.

Packets incoming from the remote node 101 through the first port 100 are forwarded through a learner resource 104 and a sender resource 105 to the second port 103. The learner resource 104 comprises learning logic which learns and stores identifiers of network protocols associated with packets forwarded from the first port 100 to the second port 103. Thus, the learner resource 104 is coupled to a learned protocol table 106, which stores, in a preferred embodiment, filter flags corresponding to learned protocols.

Packets coming from the second port 103 are forwarded to the first port 100 through a classifier resource 107 and a sender resource 108. The classifier 107 identifies network protocols associated with multi-destination packets originated in the network. Also, packets which are directed to the remote node are passed on path 109 directly to the sender resource 108. Multicast and broadcast datagrams are supplied to a filter resource 110. The filter resource includes filtering logic which selects the multi-destination packets to be forwarded out the first node by the sender 108 in response to the protocol identified by the classifier resource 107 and the learned protocol table 106.

A technique for bypassing the filter resource 110 for multicast packets is also implemented in the system. According to this aspect, the system includes a multicast address register 111 which receives a multicast address supplied by the remote node 101. This address is stored in a multicast address table 112. Multicast packets received by the classifier resource 107 are supplied to a multicast address comparator resource 113. Thus, if a multicast packet matches an address in the multicast address table 112, then it is passed directly on path 114 to the sender resource 108. If it does not match an address in the multicast address table, then it is supplied to the filter resource 110 for processing.

If the filter 110 selects the multi-destination packet for transmission to the remote node, then it is supplied on path 115 to the sender resource 108.

In operation, when the server is first initiated, all broadcast and multicast packets are blocked by the filter 110. After a remote node logs in, a packet sent by the remote node to the corporate LAN is processed by the learner resource 104. This resource detects the type of protocol in use by the remote node 101 and stores an identifier of that protocol in the learned protocol table 106. The packet is forwarded through the learner to the sender 105 and onto the remote LAN for processing as a normal packet. Typically, in the remote internetworking environment, the packet sent by the remote node will request a service available through the local area network. That service will respond with a packet which is sent back through the remote access server to the remote node. Also, while waiting for the packet, it is important that the remote node have access to broadcast and multicast traffic which is relevant to the session. Thus, the filter 110 is managed in a way which filters multicast and broadcast packets on the local area network to pass through only those multi-destination packets which are relevant to the remote node's session.

Some protocols that may be in use by a remote node may include a mode by which the remote node waits for a packet having a multicast address. If so, the remote node sends the multicast address to the multicast address register 111, which then stores it in the multicast address table 112, when it initiates the session. This table is used by the multicast address comparator 113 to bypass the filter logic 110 when a matching multicast address is detected.

The learning resource in a preferred system is supplied to detect the packet type in a TokenRing or an Ethernet environment. The most widely used Ethernet protocols include the internet protocol (IP), the interpacket exchange protocol (IPX) published by Novell, the Xerox network system (XNS) published by Xerox, the Banyan VINES protocol, the NetBIOS published by IBM and Microsoft, and the DECNet protocol published by Digital Equipment Corporation. For these six protocols, there are four types of packets which might be utilized. The Ethernet Learning Table set out below identifies the protocol and packet type which is detected by the learning resource. The final column of the table indicates the learning method used to detect a given protocol with a given packet type. In particular, protocol-specific information in the packet is used to learn the protocol in use by the remote node.

In the table, the format of the learning method field is as follows: for the IP protocol with an Ethernet II packet type, the learning method involves testing the "ethertype" field in the format for this protocol. This field resides at offset 12 (<12>), and must include either (hex)0800 or (hex)0806. With this guidance, the table should be self-explanatory.

| ETHERNET LEARNING TABLE | |
|---|---|
| Protocol/Packet Type | Learning Method |
| IP/Ethernet II | ethertype = 0 × 0800 or 0 × 0806 <12> |
| IP/SNAP | SSAP =0 × AA <15> and packet type = 0 × 0800 or 0 × 0806 <20> |
| IPX/Ethernet II | ethertype = 0 × 8137 <12> |
| IPX/SNAP | SSAP = 0 × AA <15> and packet type = 0 × 8137 <20> |
| IPX/802.3 | SSAP = 0 × FF <15>(Checksum) |
| IPX/802.2 | SSAP = 0 × E0 <15 > |
| XNS/Ethernet II | ethertype = 0 × 0600 <12> |
| VINES/Ethernet II | ethertype = 0 × 0BAD <12> |
| VINES/SNAP | SSAP = 0 × AA <15> and packet type = 0 × 0BAD <20> |
| NetBIOS/802.2 | SSAP = 0 × F0 <15> |
| DECNet/Ethernet II | ethertype = 0 × 6003 or 0 × 6004 <12> |

*The number in <> means offset of packet

The table below entitled Ethernet Filtering Table illustrates the filtering applied to broadcast and multicast packets for a given protocol and packet type. Only those packets which are explicitly indicated as forwarded make it through to the remote node. Otherwise, the packets are blocked by the remote access server, unless they are a multicast packet having an address matching a multicast address stored in the multicast address table of the remote access server.

ETHERNET FILTERING TABLE

| Protocol/Packet Type | Filtering Method |
| --- | --- |
| IP/Ethernet II | Forwarding packet type = 0 × 0806 <12> (ARP) |
| IP/SNAP | Forwarding SNAP packet type = 0 × 0806 <20> (ARP) |
| IPX/Ethernet II | Forwarding NetBIOS with packet type = 20 <19> (NetWare IPX WAN broadcast, this is used to find or check NetBIOS name) |
| IPX/SNAP | Forwarding SNAP packet type = 0 × 8137 <20> (NetWare) and NetBIOS with packet type = 20 <27> (see IPX/Ethernet II) |
| IPX/802.3 | Forwarding NetBIOS with packet type = 20 <19> (see IPX/Ethernet II) |
| IPX/802.2 | Forwarding NetBIOS with packet type = 20 <22> (see IPX/Ethernet II) |
| XNS/Ethernet II | Forwarding XNS packet type = 01 < 19> (RIP) or 04 <19> (PEP) or 05 <12> (SPP) |
| VINES/Ethernet II | Forwarding VINES packet type = 05 <19> (PEP) |
| VINES/SNAP | Forwarding SNAP packet type = 0 × 0BAD (VINES) and VINES packet type = 05 <27> (VRTP) |
| NetBIOS/802.2 | Forwarding NetBIOS with command = 08 <21> (Add Group Name Query) or 01 <21> (Datagram) or 10 <21> (Name Query) |
| DECNet/Ethernet II | Forwarding DECNet with multicast address = AB 00 00 03 00 00 <0> (Router Routing Information) |

*The number in <> means offset of packet

Figure 3A:
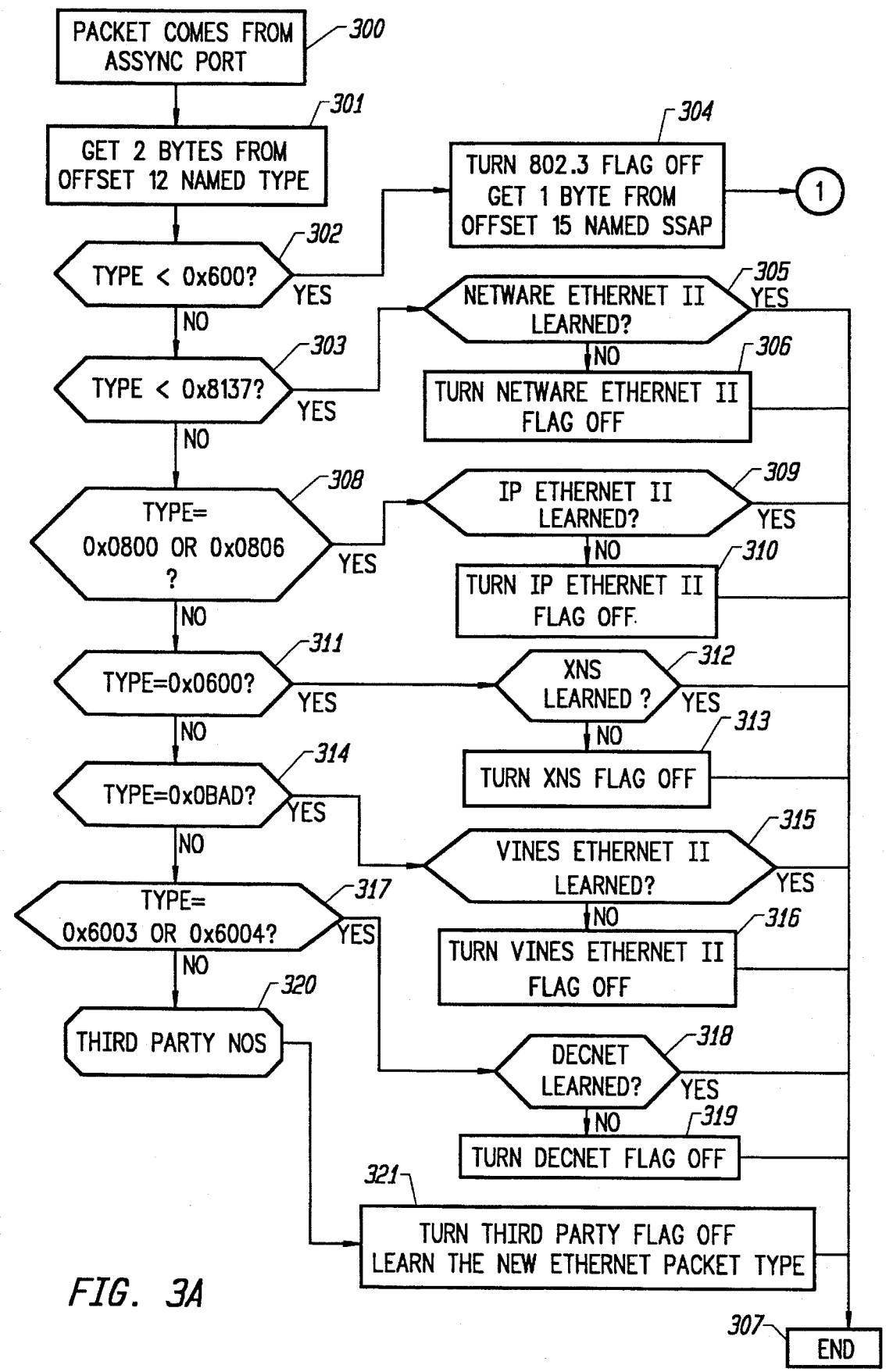
FIGS. 3A and 3B illustrate the flow chart for the logic used in learning protocols in an Ethernet environment.
Figure 3B:
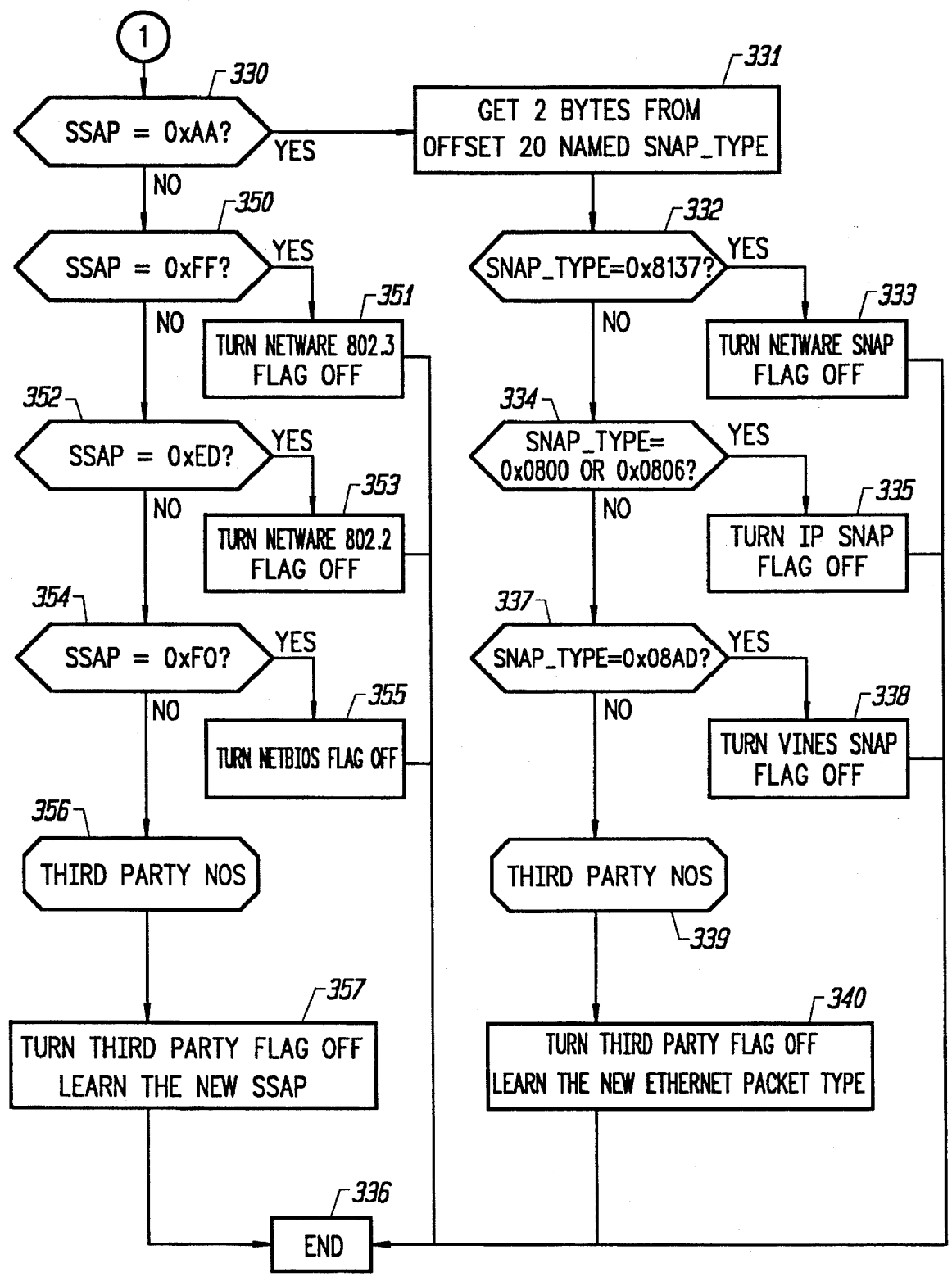

Applying the Ethernet learning rules, FIGS. 3A and 3B illustrate the logic used by the learning resource.

The process begins when a packet comes from the asynchronous port at block 300. The first step involves retrieving two bytes from offset 12 to retrieve the field named "type" in many of the protocols (block 301). First, the logic determines whether the type field is less than (hex)0600 (block 302). If it is not, then it tests for type (hex)8137 (block 303). If the type field is greater than or equal to (hex)0600, then the algorithm turns off a flag corresponding to 802.3 type packets, and gets one byte from the offset 15, which corresponds to the SSAP field in many protocols (block 304). After block 304, the algorithm passes to point 1/ in FIG. 3B.

If, at block 303, the type field matches (hex)8137, then the algorithm determines whether a NetWare Ethernet type II packet had been previously learned at block 305. If not, then the flag for NetWare Ethernet type II packet is turned off at block 306 (when the flag is "off," the packet will be filtered, if "on" the packet will be discarded by the filter logic). Then the process ends at block 307.

If, at block 303, the type field did not match (hex)8137, then the algorithm tests for type (hex)0800 or (hex)0806 (block 308). If the type field matches at block 308, then the algorithm tests whether an IP Ethernet type II packet had been previously learned at block 309. If not, then the IP Ethernet type II flag is turned off at block 310. If the flag had been previously learned, or after the flag is turned off, then the algorithm ends at block 307.

If, at block 308, the type field did not match, then it test for a match on (hex)0600 at block 311. If it matches at block 311, then the algorithm determines whether the XNS protocol had been learned previously at block 312. If not, the XNS flag is turned off at block 313 and the algorithm ends at block 307. If the flag had been previously learned, then block 313 is skipped.

If the type field did not match in block 311, then it tests for a match with (hex)0BAD at block 314. If block 314 detects a match, then the algorithm determines whether a VINES Ethernet type II protocol had been learned previously at block 315. If not, then the VINES Ethernet type II protocol flag is turned off at block 316 and the algorithm ends at block 307. If the flag had been previously turned off, then block 316 is skipped.

If, at block 314, no match is detected, then the algorithm determines whether the type field matches (hex)6003 or (hex)6004 at block 317. If a match is detected at block 317, then the algorithm determines whether DECNet had been previously learned at block 318. If not, then the DECNet flag is turned off at block 319, and the algorithm ends at block 307. Again, if the flag had been previously turned off, then block 319 is skipped.

If at block 317, no match is detected, then the algorithm assumes a third party network operating system is being utilized at block 320. In this case, a third party flag is turned off, and the algorithm learns the new Ethernet packet type at block 321. Then, the algorithm ends at block 307.

FIG. 3B illustrates the process followed after block 304 of FIG. 3A. In this process, the algorithm tests whether the SSAP filed matches (hex)AA at block 330. If a match is detected at block 330, then the algorithm retrieves two bytes from offset 20 to retrieve the "snap_type" field at block 331. Next, this field is matched with (hex)8137 at block 332. If a match is detected, then the network SNAP flag is turned off at block 333 and the algorithm ends. If no match is detected at block 332, then the field is tested for match against (hex)0800 or (hex)0806 at block 334. If a match is detected at block 334, then the IP SNAP flag is turned off at block 335 and the algorithm ends at block 336.

If at block 334, no match is detected, then the algorithm tests for a match at (hex)0BAD (block 337). If a match is detected, then the VINES SNAP flag is turned off at block 338 and the algorithm ends at block 336. If no match is detected at block 337, then a third party network operating system is assumed at block 339 and the third party flag is turned off at block 340. The new Ethernet packet type is learned by the process and the algorithm ends at block 336.

If at block 330, no match is detected, then the SSAP field is tested for (hex)FF at block 350. If a match is detected, then the NetWare 802.3 flag is turned off at block 351 and the algorithm ends. If no match is detected at block 350, then a test for a match at (hex)E0 is conducted at block 352. If a match is detected at block 352, then the NetWare 802.2 flag is turned off at block 353 and the algorithm ends. If at block 352 no match was detected, then the field is tested for a match at (hex)F0 at block 354. If a match is detected at block 354, then the NetBIOS flag is turned off at block 355. If no match is detected at block 354, then a third party network operating system is assumed at block 356, the third party flag is turned off at block 357 and the new SSAP field for the third party is learned. Then the algorithm ends at block 336.

Thus, the process of FIGS. 3A and 3B results in setting or not plurality of protocol-specific flags stored in the learned protocol table of the server. This process is dependent upon protocol-specific fields in the packets, and independent of the network address or MAC level address of the packets being transferred.

Figure 4A:
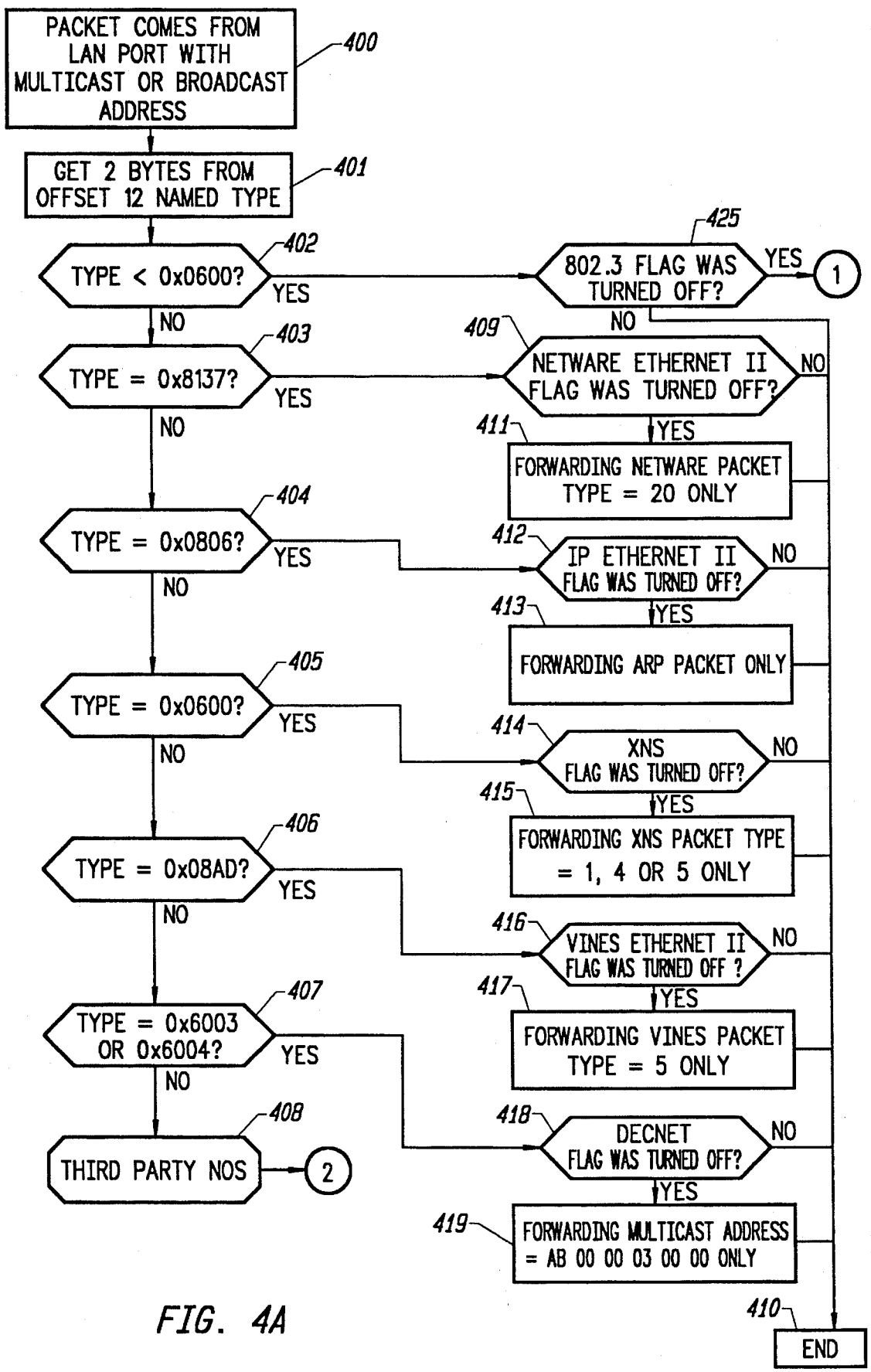
FIGS. 4A through 4C are a flow chart illustrating the logic used in filtering multicast and broadcast packets in an Ethernet environment.
Figure 4B:
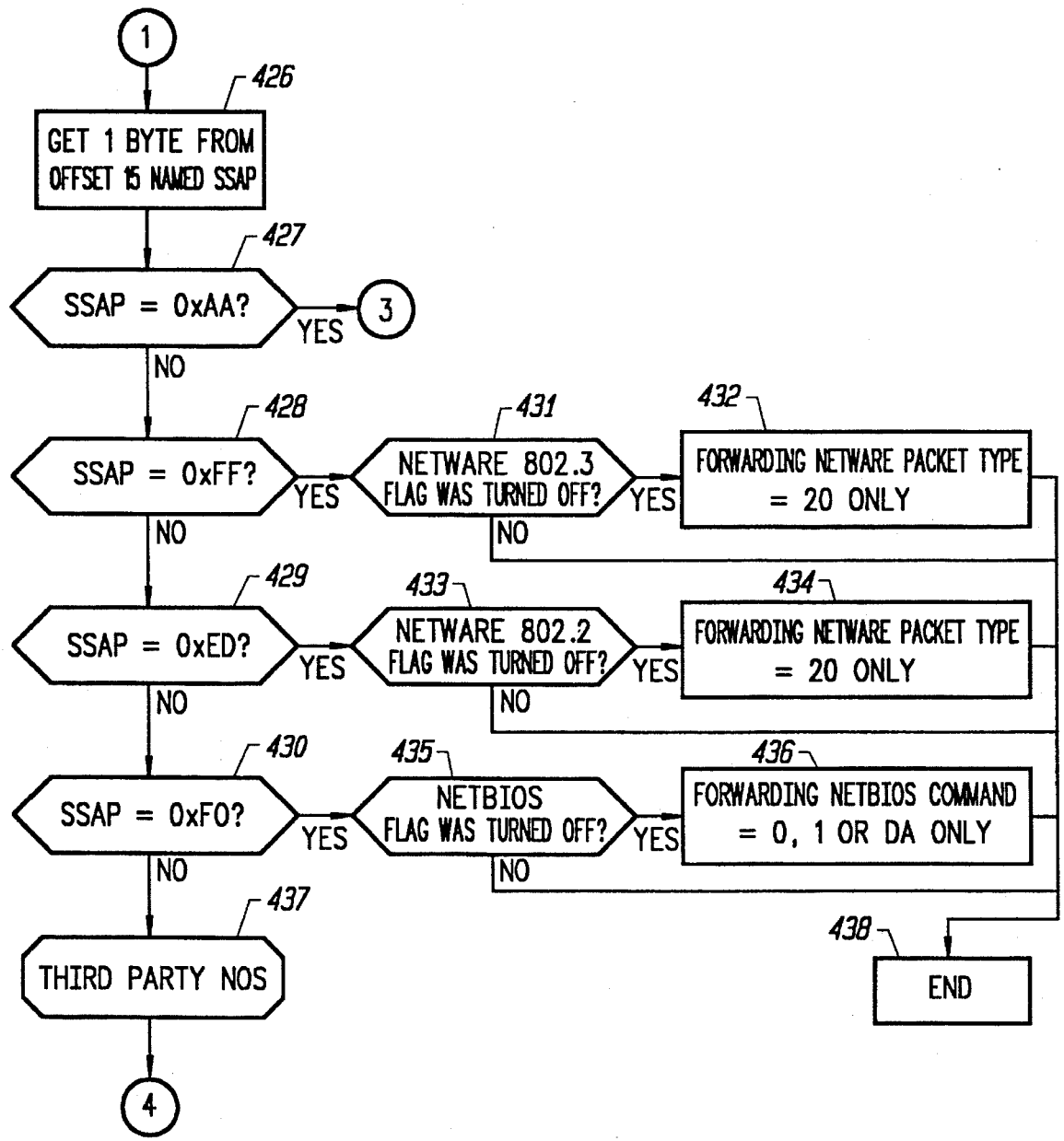
Figure 4C:
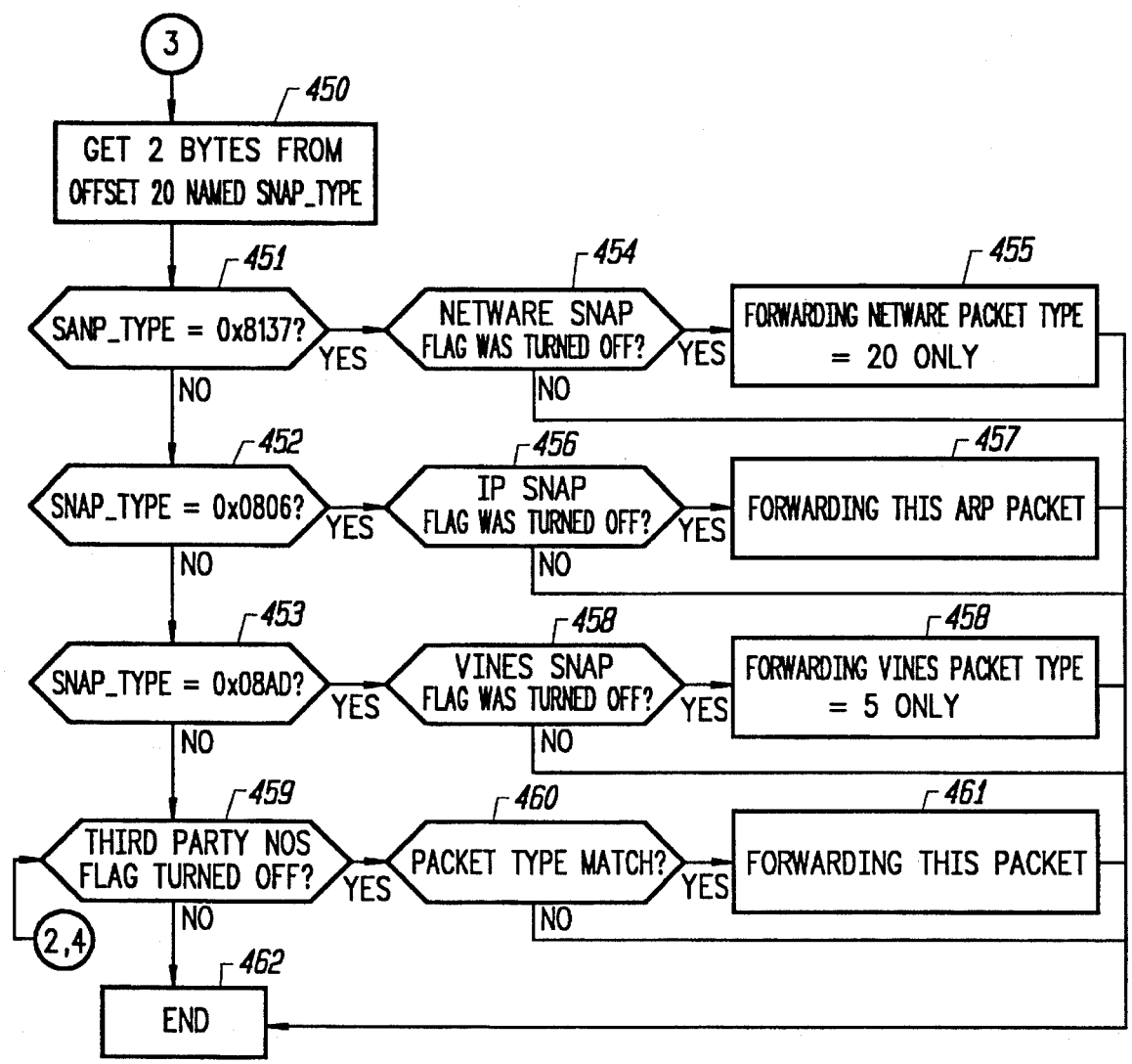

FIGS. 4A through 4C illustrate the filtering process which operates in response to the flags which are set in the process of FIGS. 3A and 3B. Thus, the filtering process begins when a packet comes from the LAN port with a multicast or broadcast address at block 400. The first step is to retrieve two bytes from offset 12 in the type field of many protocols at block 401. The algorithm tests whether the type field is less than (hex)0600 at block 402. If it is, then the field is a length field and the packet must be an 802.3, 802.2, or SNAP packet. If it is not less than (hex)0600 at block 402, then the protocol can be determined by testing the type field. Thus, the type field is tested against (hex)8137 at block 403, tested against (hex)0806 at block 404, tested against (hex)0600 at block 405, tested against (hex)0BAD at block 406, and tested against (hex)6003 or (hex)6004 at block 407. If the type field does not match any of those fields, then it is assumed to be a third party network operating system at block 408 and the algorithm loops to point 2 in FIG. 4C.

If at block 403, a match is detected, the algorithm determines whether the NetWare Ethernet II flag was turned off at block 409. If it was not, then the packet is discarded, the algorithm ends at block 410. If the flag was turned off, then the NetWare packet is forwarded if its type equals 20, as indicated at block 411.

If a match is detected at block 404, then the IP Ethernet II flag is tested at block 412. If it was not turned off, then the packet is discarded, and the algorithm ends at block 410. If the flag was turned off, then only ARP packets are forwarded, as indicated at block 413.

If at block 405, a match is detected, then the algorithm tests the XNS flag at block 414. If the XNS flag was not turned off, then the packet is discarded. If the flag was turned off, then only packet types 1, 4, or 5, according to XNS protocol are forwarded, as indicated at block 415.

If a match is detected at block 406, then the VINES Ethernet II flag is tested at block 416. If the flag was not turned off, then the packet is discarded. If the flag was turned off, then only VINES packet type 5 is forwarded, as indicated at block 417.

If a match is detected at block 407, the DECNet flag is tested, as indicated at block 418. If the DECNet flag was not turned off, then the packet is discarded. Else, only multicast packet having address AB 00 00 03 00 00 is forwarded, as indicated at block 419.

If at block 402, the type field was indicated to be less than (hex)0600, then the algorithm determines whether the 802.3 flag was turned off at block 425. If it was not, then the packet is discarded, and the algorithm ends. If it was turned off, then the process picks up at point 1 in FIG. 4B. The first step in FIG. 4B is to retrieve 1 byte from offset 15 which corresponds to the SSAP filed in many protocols (block 426). This field is tested against (hex)AA at block 427, (hex)FF at block 428, (hex)E0 at block 429, and (hex)F0 at block 430. If a match is detected at block 427, then the algorithm branches to point 3 in FIG. 4C. If a match is detected at block 428, then the NetWare 802.3 flag is tested at block 431. If the flag was not turned off, then the packet is discarded. If the flag was turned off, then only NetWare packet type 20 is forwarded, as indicated at block 432.

If a match is detected at t block 429, then the NetWare 802.2 flag is tested at block 433. If the NetWare 802.2 flag was not turned off, then the packet is discarded. If it was turned off, then only packet type 20 is forwarded, as indicated at block 434.

If a match is detected at block 430, then the NetBIOS flag is tested at block 435. If the NetBIOS flag was not turned off, then the packet is discarded. If it was turned off, then NetBIOS packets having a command field 0,1 or 0A are forwarded, as indicated at block 436.

The process of FIG. 4B ends at block 438, from blocks 431,432, 433, 434, 435, and 436.

If at block 430, no match is detected, then a third party network operating system is assumed, as indicated at block 437, and the process passes to point 4 in FIG. 4C.

FIG. 4C illustrates a processing which begins if a match is detected at block 427. For this type of packet, the "snap_type" field is processed to further identify the protocol. Thus, the first step involves retrieving two bytes from offset 20 to retrieve the snap_type field at bock 450. This field is tested against (hex)8137 at block 451, (hex)0806 at block 452, and (hex)0BAD at block 453. If a match is detected at block 451, then the NetWare SNAP flag is tested at block 454. If this flag was turned off, then only NetWare packet type 20 is forwarded, as indicated at block 455. Else, the packet is discarded.

If a match is detected at block 452, then the IP SNAP flag is tested at block 456. If this flag was turned off, then only ARP packets are forwarded, as indicated at block 457. Else, the packet is discarded.

If a match is detected at block 453, then the VINES SNAP flag is tested at block 458. If this flag was turned off, then only VINES packet type 5 is forwarded, as indicated at block 458, else the packet is discarded.

If no match is detected at block 453, then the third party network operating system flag is tested as indicated at block 459. Block 459 is also entered from point 2 of FIG. 4A and point 4 of FIG. 4B.

If the third party NOS flag was turned off as indicated at block 459, then the algorithm determines whether the learned packet type matches at block 460. This packet type was learned in the process of FIGS. 3A and 3B at blocks 321, 340, or 357.

If the packet type matches at block 460, then the packet is forwarded as indicated at block 461, else the packet is discarded. Also, if the third party network operating system flag was not turned off, then the packet is discarded and the algorithm ends as indicated at block 462.

As mentioned above, the remote access server in the preferred embodiment processes packets for Ethernet and TokenRing style networks. For TokenRing, common protocols include IP, IPX, XNS, VINES, and NetBIOS. For these five protocols, there are two standard packet types. Thus, a TokenRing Learning Table is set out below, illustrating the learning method for the various TokenRing packets and protocols. Also, a TokenRing Filtering Table is provided, illustrating the filtering method applied to the various protocol/packet types.

TOKEN RING LEARNING TABLE

| Protocol/Packet Type | Learning Method |
| --- | --- |
| IP/SNAP | SSAP = 0 × AA <15> and packet type = 0 × 0800 or 0 × 0806 <20> |
| IPX/SAP | SSAP = 0 × E0 <15> |
| IPX/SNAP | SSAP = 0 × AA <15> and packet type = 0 × 8137 <20> |
| XNS/SAP | SSAP = 0 × 80 <15> and packet type 0 × 0600 <17> |
| XNS/SNAP | SSAP = 0 × AA <15> and packet type = 0 × 0600 <20> |
| VINES/SAP | SSAP = 0 × BC <15> |
| NetBIOS/SAP | SSAP = 0 × F0 <15> |

*The number in <> means offset of packet (excluding source routing information (SRI)).

TOKEN RING FILTERING TABLE

| Protocol/Packet Type | Filtering Method |
| --- | --- |
| IP/SNAP | Forwarding packet type = 0 × 0806 <20>* (ARP) |
| IPX/SAP | Forwarding NetBIOS with packet type = 20 <22> (NetWare IPX WAN broadcast, this is used to find or check NetBIOS name) |
| IPX/SNAP | Forwarding NetBIOS with packet type = 20 <27> (NetWare IPX WAN broadcast, this is used to find or check NetBIOS name) |
| XNS/SAP | Forwarding XNS packet type = 01 <22> (RIP) or 04 <22> (PEP) or 05 <22> (SPP) |
| XNS/SNAP | Forwarding XNS packet type = 01 <27> (RIP) or 04 <27> (PEP) or 05 427> (SPP) |
| VINES/SAP | Forwarding VINES packet type = 05 <22> (VRTP) |
| NetBIOS/SAP | Forwarding NetBIOS with command = 00 <19> (Add Group Name Query) or 01 <19> (Add Name Query) or 10<19> (Name Query) |

*The number in <> means offset of packet (excluding source routing information (SRI)).

Figure 5A:
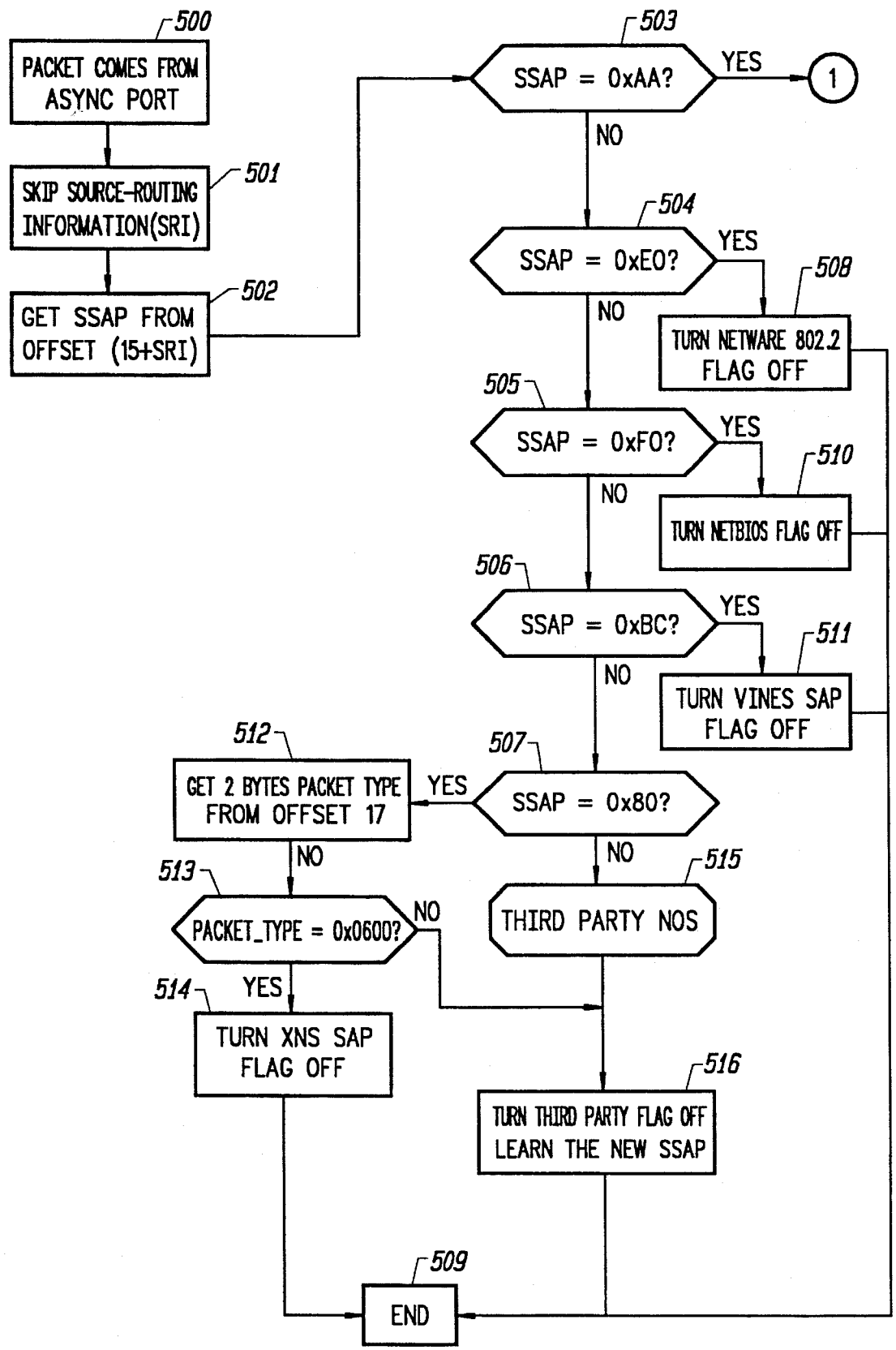
FIGS. 5A and 5B are a flow chart illustrating the logic used in learning protocols used in a TokenRing environment.
Figure 5B:
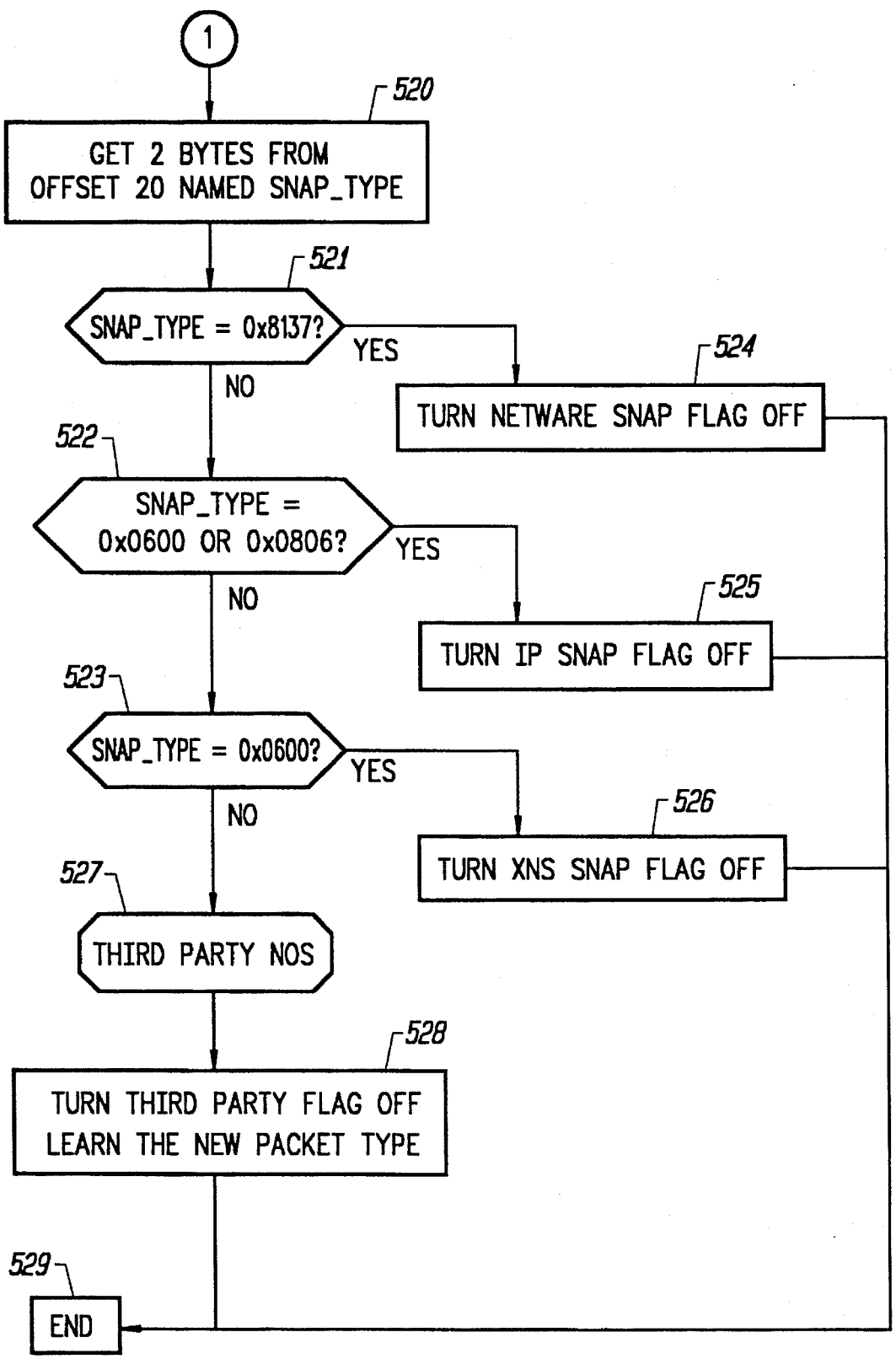

FIGS. 5A through 5B illustrate the learning logic used by the remote access server in the TokenRing environment. This process begins when a packet is received from the asynchronous port at block 500. The source routing information SRI in the TokenRing packet is skipped at block 501. Next, the field labelled SSAP from the offset 15 after the source routing information field is retrieved, as indicated at block 502. Next, this field is tested against (hex)AA at block 503, against (hex)E0 at block 504, against (hex)F0 at block 505, against (hex)BC at block 506, and against (hex)80 at block 507. If a match is detected at block 503, then the algorithm picks up at point 1 in FIG. 5B. If a match is detected at block 504, then the NetWare 802.2 flag is turned off at block 508 and the algorithm ends at block 509. If a match is detected at block 505, then the NetBIOS flag is turned off at block 510 and the algorithm ends. If a match is detected at block 506, then the VINES SAP flag is turned off at block 511, and the algorithm ends. If a match is detected at block 507, then two bytes from the packet type field at offset 17 are retrieved, as indicated at block 512. This field is tested against (hex)0600 at block 513. If a match is detected, then the XNS SAP flag is turned off at block 514. If no match is detected at block 507, then a third party network operating system is assumed at block 515. Then, the third party flag is turned off at block 516 and the new SSAP field value is learned. Also, if no match is detected at block 513, the process of block 516 is executed.

If a match is detected at block 503, then the process illustrated in FIG. 5B is executed. This involves retrieving two bytes from offset 20, corresponding to a field named snap_type at block 520. This field is tested against (hex)8137 at block 521, tested against (hex)0800 or (hex)0806 at block 522, and tested against (hex)0600 at block 523. If a match is detected at block 521, then the NetWare SNAP flag is turned off at block 524. If a match is detected at block 522, then the IP SNAP flag is turned off at block 525. If a match is detected at block 523, then the XNS SNAP flag is turned off at block 526.

If no match is detected at block 523, then a third party network operating system is assumed at block 527, the third party flag is turned off and the new packet type is learned at block 528. Finally, the algorithm ends at block 529.

Figure 6A:
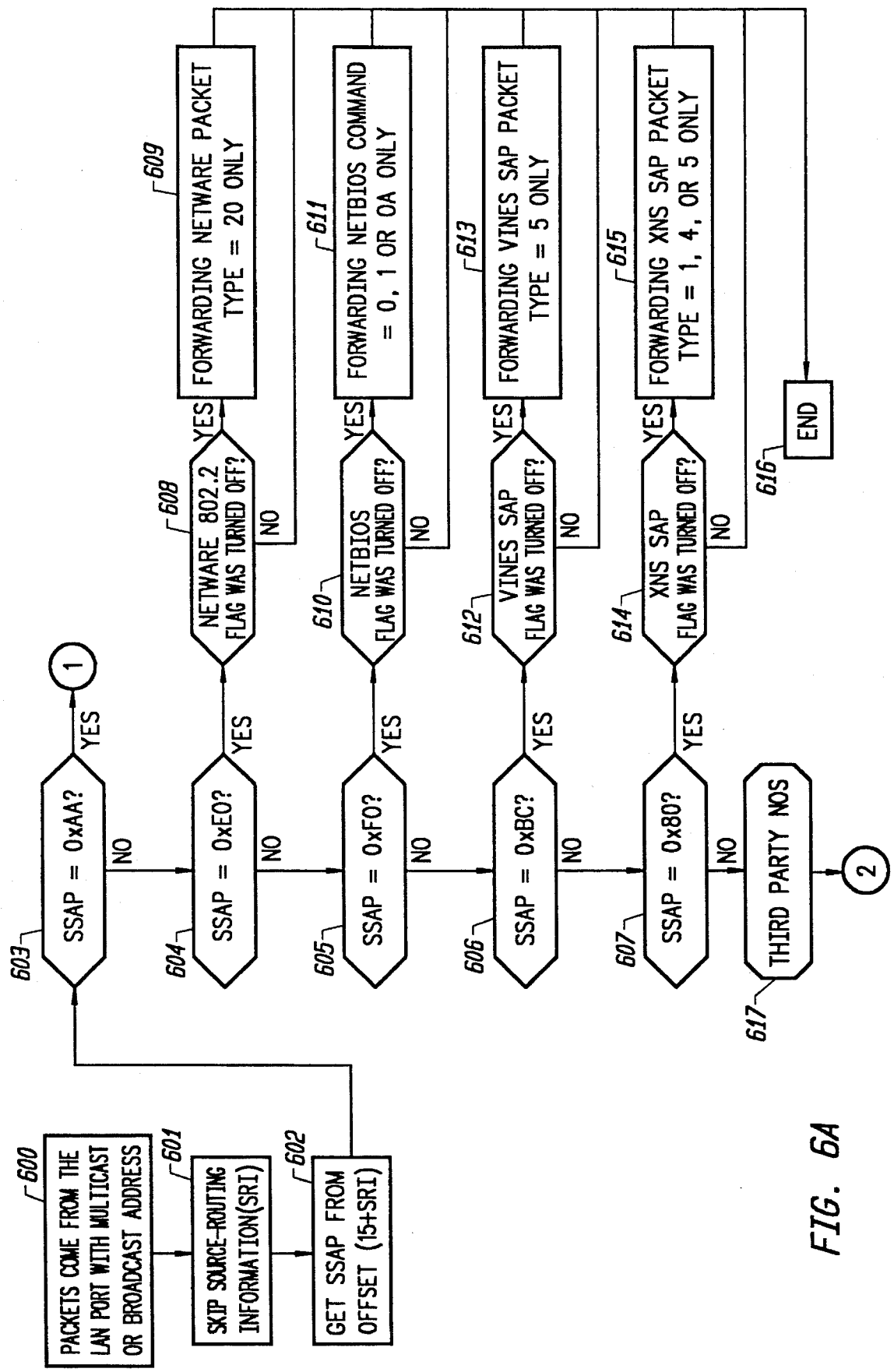
FIGS. 6A and 6B are a flow chart illustrating the logic used in filtering multicast and broadcast packets in a Token-Ring environment.
Figure 6B:
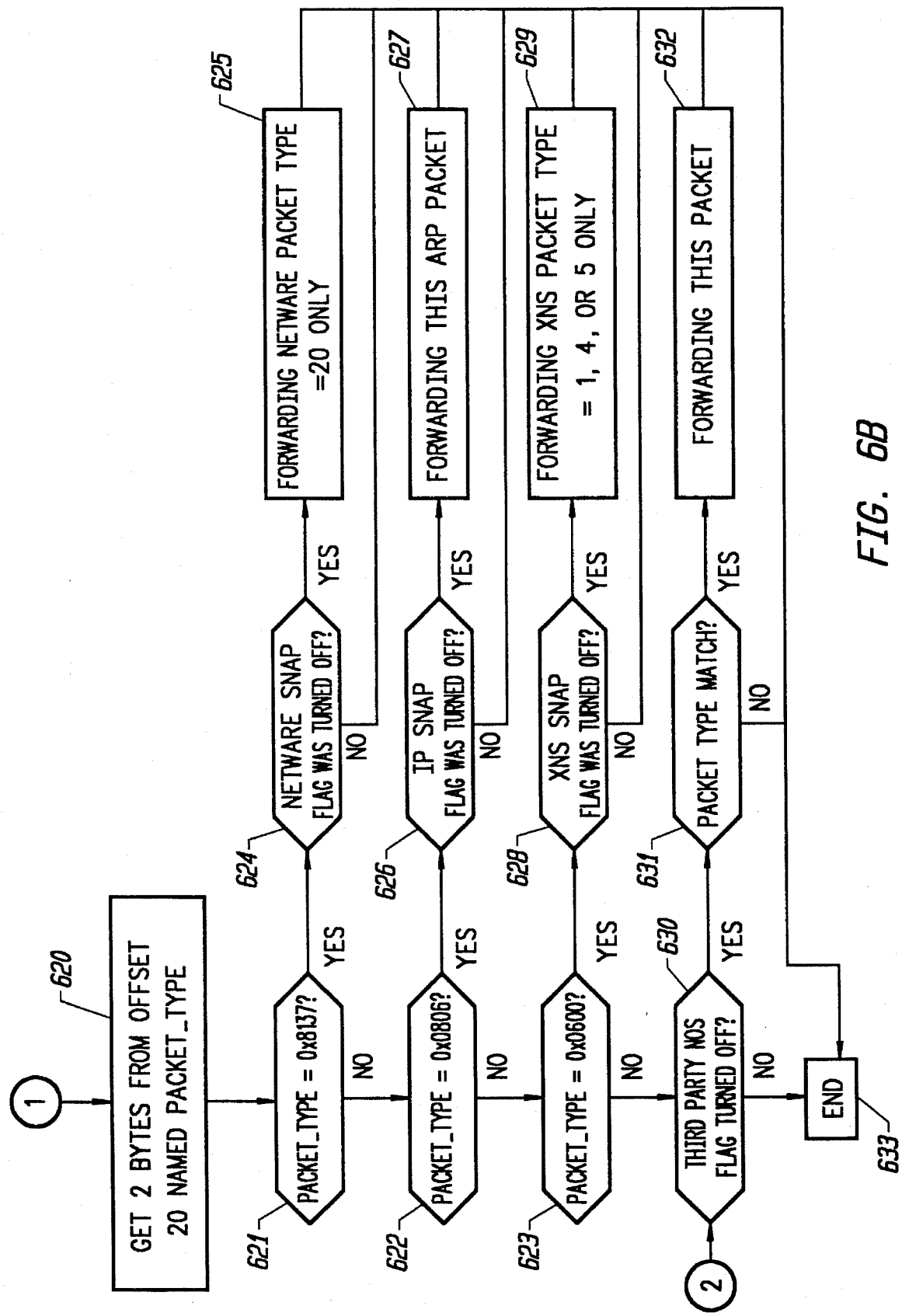

FIGS. 6A and 6B illustrate the filtering process in the TokenRing environment. This process begins when packets are received from the LAN port with a multicast or broadcast address at block 600. The source routing information field is skipped at block 601, and the SSAP field from offset 15 plus the source routing information field offset is retrieved at block 602. The SSAP field is tested against (hex)AA at block 603, (hex)E0 at block 604, (hex)F0 at block 605, (hex)BC at block 606, and (hex)80 at block 607. If a match is detected at block 603, then the algorithm branches to point 1 of FIG. 6B.

If a match is detected at block 604, then the NetWare 802.2 flag is tested at block 608. If the flag was turned off, then only NetWare packet type 20 is forwarded, as indicated at block 609. Else, the packet is discarded.

If a match is detected at block 605, then the NetBIOS flag is tested at block 610. If the NetBIOS flag was turned off, then only NetBIOS commands 0,1 or 0A are forwarded, as indicated at block 607. Else, the packet is discarded.

If a match is detected at block 606, then the VINES SAP flag is tested at block 612. If the VINES SAP flag was turned off, then only VINES SAP packet type 5 is forwarded, as indicated at block 613. Else, the packet is discarded.

If a match is detected at block 607, then the XNS SAP flag is tested at block 614. If this flag is turned off, then only packet types 1,4, and 5 are forwarded, as indicated at block 615; else, the packet is discarded.

If no match is detected at block 607, then a third party network operating system is assumed at block 617 and the algorithm branches to point 2 in FIG. 6B.

After blocks 608–615, the algorithm ends at block 616.

FIG. 6B picks up if a match is detected at block 603 in FIG. 6A. If this happens, then two bytes from offset 20 are retrieved corresponding to the packet type field in many protocols (block 620). The packet type field is tested against (hex)8137 in block 621, against (hex)0806 in block 622, and against (hex)0600 in block 623.

If a match is detected in block 621, then the NetWare SNAP flag is tested at block 624. If this flag was turned off, then only NetWare packet type 20 is forwarded, as indicated at block 625; else, the packet is discarded.

If a match is detected at block 622, then the IP SNAP flag is tested at block 626. If this flag was turned off, then only this ARP packet is forwarded, as indicated at block 627; else, the packet is discarded.

If a match is detected at block 623, then the XNS SNAP flag is tested at block 628. If this flag was turned off, then only XNS packet types 1, 4, or 5 are forwarded, as indicated at block 629; else, the packet is discarded.

If no match is detected at block 623, then a third party NOS flag is tested at block 630. This block 630 is also entered from point 2 in FIG. 6A. If the third party NOS flag was turned off, then the learned packet type is tested at block 631. If there was a match, then this packet is forwarded as indicated at block 632; else, the packet is discarded.

After blocks 624–632, then the algorithm ends, as indicated at block 633.

Accordingly, the present invention provides an automatic filtering of broadcast and multicast packets particularly suited to the remote access server environment. The process is based on learning the user's protocol in response to packets sent by the user. Next, a filter pattern is set up based on the learned protocols. This pattern is applied to incoming LAN traffic, to manage transfer of broadcast and multicast packets across the switched network links to remote nodes. The process is recursive, allowing the filtering pattern to adapt to changing use patterns.

This process overcomes the need for intelligent administration of filtering services provided in prior art systems, making the remote access server using the automatic filtering of the present invention a plug and play type device.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus which manages transfer of multi-destination packets from a local network to a remote node, comprising: a first port for communication with the remote node;

a second port for communication with the local network;

incoming packet sender resource, coupled to the first and second ports, which forward packets originated by the remote node from the first port to the second port;

learning logic, coupled with the incoming packet sender resource, which learns and stores identifiers of network protocols associated with packets forwarded from the first port to the second port;

filtering logic, coupled with the second port and the learning logic, which identifies network protocols associated with multi-destination packets originated in the local network, and selects multi-destination packets in response to identified network protocols and the stored identifiers of network protocols, to be forwarded to the remote node; and outgoing packet sender resource, coupled with the filtering logic and to the first and second ports, which forward multi-destination packets selected by the filtering logic from the second port to the first port.

2. The apparatus of claim 1, wherein the learning logic determines a network protocol of a packet in response to protocol specific information in the packet.

3. The apparatus of claim 1, wherein the filtering logic determines a network protocol of a packet in response to protocol specific information in the packet.

4. The apparatus of claim 1, wherein the learning logic determines a network protocol of a packet in response to protocol specific information in the packet, and independent of a network destination address of the packet.

5. The apparatus of claim 4, wherein the learning logic determines the network protocol of a packet independent of a MAC level address of the packet.

6. The apparatus of claim 1, wherein packets in the local network have a packet type field, and the learning logic determines the network protocol of a packet in response to the packet type field.

7. The apparatus of claim 1, wherein packets in the local network have a source service access point (SSAP) field, and the learning logic determines the network protocol of a packet in response to the source service access point field.

8. The apparatus of claim 1, wherein the filtering logic includes resources to select multi-destination packets within a limited subset of a set of multi-destination packet types used by a given protocol.

9. The apparatus of claim 8, including resources to identify multi-destination packets within the subset of packet types based upon one or more of packet type fields, source service access point (SSAP) fields and network-specific command fields.

10. The apparatus of claim 1, wherein the learning logic includes resources to detect when an unknown protocol is used by the remote node, to learn characteristics of packets according to the unknown protocol, and the filtering logic includes resources to select for forwarding to the remote node multi-destination packets which have the learned characteristics.

11. The apparatus of claim 1, including resources which store multi-destination addresses supplied by a user of the remote node, and wherein the filtering logic is responsive to the stored multi-destination addresses to select multi-destination packets to be forwarded from the second port to the first port independent of a network protocol associated with the packet.

12. The apparatus of claim 1, wherein the multi-destination packets include broadcast packets.

13. The apparatus of claim 1, wherein the first port comprises an interface to a switched network.

14. The apparatus of claim 1, wherein the first port comprises a point-to-point connection to the remote node.

15. The apparatus of claim 1, wherein the filtering logic includes a plurality of protocol specific filters, and logic for enabling and disabling the protocol specific filters in response to the stored identifiers of network protocols.

16. A method for managing pass through of multi-destination packets from a network across a communication link to a remote node, comprising:

learning a protocol used by the remote node in response to a packet transmitted to the network by the remote node and providing a learned protocol identifier;

storing the learned protocol identifier;

identifying protocols of multi-destination packets originated in the network; and selecting a particular multi-destination packet received from the network to be forwarded to the remote node in response to a relationship between the learned protocol identifier and the protocol of the particular multi-destination packet.

17. The method of claim 16, including:

storing addresses provided by the remote node in a multicast address table of multi-destination packets to be forwarded to the remote node; and selecting multi-destination packets to be forwarded to the remote node if the multi-destination packet has a multicast address in the multicast address table.

18. The method of claim 16, wherein the step of learning includes determining whether a packet has a protocol specific information in the packet.

19. The method of claim 16, wherein the step of identifying includes determining whether a packet has a protocol specific information in the packet.

20. The method of claim 16, wherein packets in the network have a packet type field, and the step of learning includes determining the network protocol of a packet in response to the packet type field.

21. The method of claim 16, wherein packets in the network have a source service access point (SSAP) field, and the step of learning includes determining the network protocol of a packet in response to the source service access point field.

22. The method of claim 16, wherein the step of selecting includes selecting multi-destination packets within a limited subset of a set of multi-destination packet types used by a given protocol.

23. The method of claim 22, including identifying multi-destination packets within the subset of packet types based upon one or more of packet type fields, source service access point (SSAP) fields and network-specific command fields.

24. The method of claim 16, wherein the step of learning includes detecting when an unknown protocol is used by the remote node, and learning characteristics of packets according to the unknown protocol, and the step of filtering includes selecting for forwarding to the remote node multi-destination packets which have the learned characteristics.

25. The method of claim 16, wherein the network comprises an carrier sense, multiple access with collision detection CSMA/CD network.

26. The method of claim 16, wherein the network comprises a token passing ring network.

27. An apparatus which manages transfer of broadcast and multicast packets from a local area network to a remote node, comprising:

a first port which serves a switched network link which provides a path to the remote node;

a second port which serves the local area network;

incoming packet sender resource, coupled to the first and second ports, which forward packets originated by the remote node from the first port to the second port;

learning logic, coupled with the incoming packet sender resource, which learns network protocols associated with packets forwarded from the first port to the second port in response to protocol specific information in the packets, and stores identifiers of learned protocols;

filtering logic, coupled with the second port and the learning logic, including a plurality of protocol specific filters, and logic for enabling and disabling the protocol specific filters in response to the stored identifiers of network protocols, the filtering logic identifying network protocols associated with broadcast and multicast packets originated in the local network in response to protocol specific formats of the packets, and selects broadcast and multicast packets to be forwarded to the remote node in response to identified network protocols and the enabled and disabled protocol specific filters; and outgoing packet sender resource, coupled with the first and second ports and the filtering logic, which forward unicast packets addressed to the remote node and which forward broadcast and multicast packets selected by the filtering logic from the second port to the first port.

28. The apparatus of claim 27, wherein packets in the local area network have a packet type field, and the learning logic determines the network protocol of a packet in response to the packet type field.

29. The apparatus of claim 27, wherein packets in the local area network have a source service access point (SSAP) field, and the learning logic determines the network protocol of a packet in response to the source service access point field.

30. The apparatus of claim 27, wherein the filtering logic includes resources to select multi-destination packets within a limited subset of a set of multi-destination packet types used by a given protocol.

31. The apparatus of claim 30, wherein the resources identify multi-destination packets within the subset of packet types based upon one or more of packet type fields, source service access point (SSAP) fields and network-specific command fields.

32. The apparatus of claim 27, wherein the learning logic includes resources to detect when an unknown protocol is used by the remote node, to learn characteristics of packets according to the unknown protocol, and the filtering logic includes resources to select for forwarding to the remote node multi-destination packets which have the learned characteristics.

33. The apparatus of claim 27, including resources which store multicast addresses supplied by the remote node, and the filtering logic is responsive to the stored multicast addresses to select multicast packets to be forwarded from the second port to the first port independent of a network protocol associated with the packet.

34. The apparatus of claim 27, wherein the local area network comprises an carrier sense, multiple access with collision detection CSMAICD network.

35. The apparatus of claim 27, wherein the local area network comprises a token passing ring network.

* * * * *